US009275154B2

(12) United States Patent
Myllymaki et al.

(10) Patent No.: US 9,275,154 B2
(45) Date of Patent: Mar. 1, 2016

(54) CONTEXT-SENSITIVE POINT OF INTEREST RETRIEVAL

(75) Inventors: Jussi Myllymaki, Espoo (FI); David P. Singleton, London (GB); Al Cutter, Morden (GB)

(73) Assignee: GOOGLE INC., Mountain View, CA (US)

( * ) Notice: Subject to any disclaimer, the term of this patent is extended or adjusted under 35 U.S.C. 154(b) by 682 days.

(21) Appl. No.: 12/818,982

(22) Filed: Jun. 18, 2010

(65) Prior Publication Data

US 2011/0313657 A1    Dec. 22, 2011

(51) Int. Cl.
*G01C 21/00* (2006.01)
*G06F 17/30* (2006.01)
*G01C 21/36* (2006.01)
(Continued)

(52) U.S. Cl.
CPC ........ *G06F 17/3087* (2013.01); *G01C 21/3679* (2013.01); *G01C 21/3682* (2013.01); *H04W 4/02* (2013.01); *H04W 4/027* (2013.01); *H04W 4/18* (2013.01); *G01C 21/20* (2013.01); *G01C 21/26* (2013.01)

(58) Field of Classification Search
CPC ........ G01C 21/20; G01C 21/26; G01C 21/30; G01C 21/32; G01C 21/34; G01C 21/36; G01C 21/3476; G01C 21/3605; G01C 21/3614; G01C 21/3679; G01C 21/3682
USPC ......... 701/400, 408, 426, 430, 438–439, 451, 701/453–454, 461–462, 491, 516, 540; 340/988–990, 995.1–995.12, 995.18, 340/995.24
See application file for complete search history.

(56) References Cited

U.S. PATENT DOCUMENTS

| | | | |
|---|---|---|---|
| 5,930,474 A | | 7/1999 | Dunworth et al. |
| 6,064,941 A | * | 5/2000 | Nimura et al. ................. 701/416 |

(Continued)

FOREIGN PATENT DOCUMENTS

| | | |
|---|---|---|
| EP | 2 237 174 A1 | 10/2010 |
| JP | 2005 078206 | 3/2005 |

(Continued)

OTHER PUBLICATIONS

Anonymous: "Offnungszeiten", mbtheme.com Apr. 20, 2010, [retrieved on Jul. 27, 2011], Retrieved from the Internet: URL:http://www.mbtheme.com/WebApp/Tools-Utilities/201004/ffnungszeiten_41266-41266.html , 3 pages.

(Continued)

*Primary Examiner* — Jack W Keith
*Assistant Examiner* — Chuong P Nguyen
(74) *Attorney, Agent, or Firm* — Marshall, Gerstein & Borun LLP

(57) ABSTRACT

Methods, systems, and apparatus, including computer programs encoded on one or more computer storage devices, for context sensitive point of interest retrieval. In one aspect, a method includes receiving a current location of a user's electronic device and retrieving multiple points of interest within a predetermined distance to the current location. Each point of interest is ranked based on the point of interest's proximity to the current location and one or more time-related attributes associated with the point of interest. Data identifying one or more of the points of interest is provided to the electronic device for presentation to the user on a display of the electronic device based on the ranking.

21 Claims, 7 Drawing Sheets

(51) Int. Cl.
*H04W 4/02* (2009.01)
*H04W 4/18* (2009.01)
*G01C 21/20* (2006.01)
*G01C 21/26* (2006.01)

(56) References Cited

U.S. PATENT DOCUMENTS

| | | | |
|---|---|---|---|
| 6,529,143 B2* | 3/2003 | Mikkola et al. | 340/995.1 |
| 6,542,814 B2* | 4/2003 | Polidi et al. | 701/454 |
| 6,865,483 B1* | 3/2005 | Cook et al. | 340/995.14 |
| 6,934,628 B2* | 8/2005 | Harada | 701/438 |
| 7,599,792 B1* | 10/2009 | Smith | 701/426 |
| 7,634,463 B1 | 12/2009 | Katragadda et al. | |
| 7,685,144 B1 | 3/2010 | Katragadda | |
| 7,720,844 B2* | 5/2010 | Chu et al. | 707/724 |
| 7,751,968 B2* | 7/2010 | Yamada et al. | 701/426 |
| 7,890,259 B2* | 2/2011 | Kamdar et al. | 701/420 |
| 8,014,939 B2* | 9/2011 | Sheha et al. | 701/426 |
| 8,401,786 B2* | 3/2013 | Poppen et al. | 701/468 |
| 8,427,303 B1* | 4/2013 | Brady et al. | 340/539.11 |
| 2003/0036848 A1* | 2/2003 | Sheha et al. | 701/209 |
| 2003/0165254 A1 | 9/2003 | Chen et al. | |
| 2003/0195877 A1 | 10/2003 | Ford et al. | |
| 2004/0236504 A1* | 11/2004 | Bickford et al. | 701/207 |
| 2005/0004889 A1 | 1/2005 | Bailey et al. | |
| 2005/0076014 A1 | 4/2005 | Agarwal | |
| 2005/0289141 A1 | 12/2005 | Baluja | |
| 2006/0004850 A1 | 1/2006 | Chowdhury | |
| 2006/0064411 A1 | 3/2006 | Gross et al. | |
| 2006/0069504 A1 | 3/2006 | Bradley et al. | |
| 2006/0123014 A1 | 6/2006 | Ng | |
| 2006/0230350 A1 | 10/2006 | Baluja | |
| 2006/0265361 A1 | 11/2006 | Chu | |
| 2006/0287810 A1* | 12/2006 | Sadri et al. | 701/200 |
| 2007/0032942 A1* | 2/2007 | Thota | 701/200 |
| 2007/0032947 A1* | 2/2007 | Yamada et al. | 701/208 |
| 2007/0061301 A1 | 3/2007 | Ramer et al. | |
| 2007/0078851 A1 | 4/2007 | Grell et al. | |
| 2007/0118533 A1 | 5/2007 | Ramer et al. | |
| 2007/0143345 A1 | 6/2007 | Jones et al. | |
| 2007/0219706 A1* | 9/2007 | Sheynblat | 701/200 |
| 2007/0233736 A1 | 10/2007 | Xiong et al. | |
| 2008/0010259 A1 | 1/2008 | Feng et al. | |
| 2008/0065685 A1 | 3/2008 | Frank | |
| 2008/0076451 A1 | 3/2008 | Sheha et al. | |
| 2008/0104055 A1 | 5/2008 | Segel | |
| 2008/0104227 A1 | 5/2008 | Birnie et al. | |
| 2008/0172173 A1 | 7/2008 | Chang et al. | |
| 2008/0172362 A1 | 7/2008 | Shacham et al. | |
| 2008/0172374 A1 | 7/2008 | Wolosin et al. | |
| 2008/0215557 A1 | 9/2008 | Ramer et al. | |
| 2009/0012955 A1* | 1/2009 | Chu et al. | 707/5 |
| 2009/0088967 A1 | 4/2009 | Lerner et al. | |
| 2009/0089149 A1 | 4/2009 | Lerner et al. | |
| 2009/0125505 A1 | 5/2009 | Bhalotia et al. | |
| 2009/0265340 A1 | 10/2009 | Barcklay et al. | |
| 2010/0076979 A1 | 3/2010 | Wang et al. | |
| 2010/0083169 A1 | 4/2010 | Athsani et al. | |
| 2010/0087209 A1 | 4/2010 | Holm | |
| 2010/0088631 A1 | 4/2010 | Schiller | |
| 2010/0106399 A1* | 4/2010 | Waeller et al. | 701/201 |
| 2010/0205060 A1* | 8/2010 | Athsani et al. | 705/14.58 |
| 2010/0217525 A1 | 8/2010 | King et al. | |
| 2010/0328344 A1 | 12/2010 | Mattila et al. | |
| 2010/0331016 A1 | 12/2010 | Dutton et al. | |
| 2011/0131243 A1* | 6/2011 | Aben et al. | 707/771 |
| 2011/0224864 A1 | 9/2011 | Gellatly et al. | |
| 2012/0011137 A1 | 1/2012 | Sheha et al. | |

FOREIGN PATENT DOCUMENTS

| | | |
|---|---|---|
| JP | 2005-078206 A | 3/2005 |
| JP | 2007-040721 A | 2/2007 |
| JP | 2010-071885 A | 4/2010 |
| JP | 2010-100938 A | 5/2010 |
| WO | WO-2009/075043 A1 | 6/2009 |
| WO | 2010/040405 | 4/2010 |

OTHER PUBLICATIONS

International Search Report and Written Opinion from related PCT International Application No. PCT/US2011/038810, 13 pages.
Ofori-Awuah, Meanie. USPTO, Non-Final Office Action mailed Aug. 8, 2011 in U.S. Appl. No. 12/415,989, filed Mar. 31, 2009, 20 pages.
Ofori-Awuah, Maame. USPTO, Non-Final Office Action mailed Mar. 15, 2012 in U.S. Appl. No, 12/415,969, filed Mar. 31, 2009, 12 pages.
Myllymake, Jussi, USPTO, Non-Final Office Action mailed Oct. 5, 2012 in U.S. Appl. No. 12/818,982, filed. Jun. 18, 2010, 19 pages.
International Preliminary Report on Patentability from Related PCT International Application No. PCT/US2001/038810, 7 pages.
Office Action issued in U.S. Appl. No. 12/819,041, mailed Mar. 26, 2015.
Japanese Office Action for Application No. 2013-515366, dated Mar. 16, 2015.
Joko et al., "A Method for Inferring Destinations Based on User Preference in Indoor Environments Navigation Systems," *Information Processing Society of Japan,* 2002(24):189-196 (2002).
Notice of Allowance for U.S. Appl. No. 12/819,041, dated Jul. 22, 2015.

* cited by examiner

CONTEXT-SENSITIVE POINT OF INTEREST RETRIEVAL

TECHNICAL FIELD

This specification relates to selecting information to present to a user of an electronic device based on the user's current location.

BACKGROUND

The use of mobile electronic devices with Internet connectivity has increased significantly over the past few years, as the availability and speed of wireless Internet service has improved. Search queries that may have in the past been input by a user sitting at a home or office computer, are now often input on the fly while the user is at a location relevant to his or her particular query. For example, as a user is leaving his office, he may search for nearby restaurants on a mobile telephone. Later, as the user is leaving a restaurant, the user may use the mobile telephone to search for telephone numbers for taxi-cab companies. Users often rely on their mobile electronic devices to retrieve a map of a current location and search for businesses or other points of interest in their surroundings. The volume of this type of information now available over the Internet has, at least in some densely populated areas, become overwhelming. Users can end up being presented with too much information, a lot of which is not relevant to them in their current context.

SUMMARY

This specification describes technologies relating to selecting points of interest or categories of information to present to a user based on the user's current location as indicated by a mobile device or system that determines a location of a mobile device.

In general, one innovative aspect of the subject matter described in this specification can be embodied in methods that include the actions of receiving a current location of a user's electronic device and retrieving multiple points of interest within a predetermined distance to the current location. Each point of interest is ranked based on the point of interest's proximity to the current location and one or more time-related attributes associated with the point of interest. Data identifying one or more of the points of interest is provided to the electronic device for presentation to the user on a display of the electronic device based on the ranking. Other embodiments of this aspect include corresponding systems, apparatus, and computer programs, configured to perform the actions of the methods, encoded on computer storage devices.

These and other embodiments can each optionally include one or more of the following features. The predetermined distance can be determined based on a density of points of interest in an area including the current location. The predetermined distance can be a radial distance from the current location and can be further based on a desired number of points of interest to be retrieved. The one or more time-related attributes can include an attribute that indicates whether the point of interest is open or closed for operation at a time at which the current location is received, and if the point of interest is open, the ranking for the point of interest is boosted.

Each point of interest can be associated with a category and the one or more time-related attributes can include an attribute that indicates a probability that the category associated with the point of interest is relevant to the user at a time at which the current location is received.

Providing one or more of the points of interest to the electronic device for presentation to the user on a display of the electronic device can include providing the one or more points of interest as suggested search queries. Providing one or more of the points of interest to the electronic device for presentation to the user on a display of the electronic device can include retrieving a portion of a map that includes the current location and the one or more points of interest, and providing the portion of the map to the electronic device for presentation to a user on a display of the electronic device. The map can be overlaid with one or more graphical elements representing the one or more points of interest, where the one or more graphical elements are overlaid on the map in proximity to locations corresponding to the points of interest represented by the graphical elements.

Particular embodiments of the subject matter described in this specification can be implemented so as to realize one or more of the following advantages. A user can be provided with selected information that is relevant to a current location of the user. The selected information can be filtered to provide information about points of interest relevant not only to the current location but the current time. For example, if a user is a member of an online social network, the user can receive information about points of interest in the user's surroundings that is relevant to mobile updates recently posted by others in the social network. The user can end up receiving fresh information relevant to the user's current surroundings and own network of friends within the social network, as compared to an overwhelming volume of largely irrelevant, unfiltered information. By taking into account the current time, a system can further filter the information presented to the user such that categories of information relevant at that current time are presented to the user, and largely irrelevant categories are not presented. This can be particularly important when display screen area is limited, such as on a mobile electronic device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
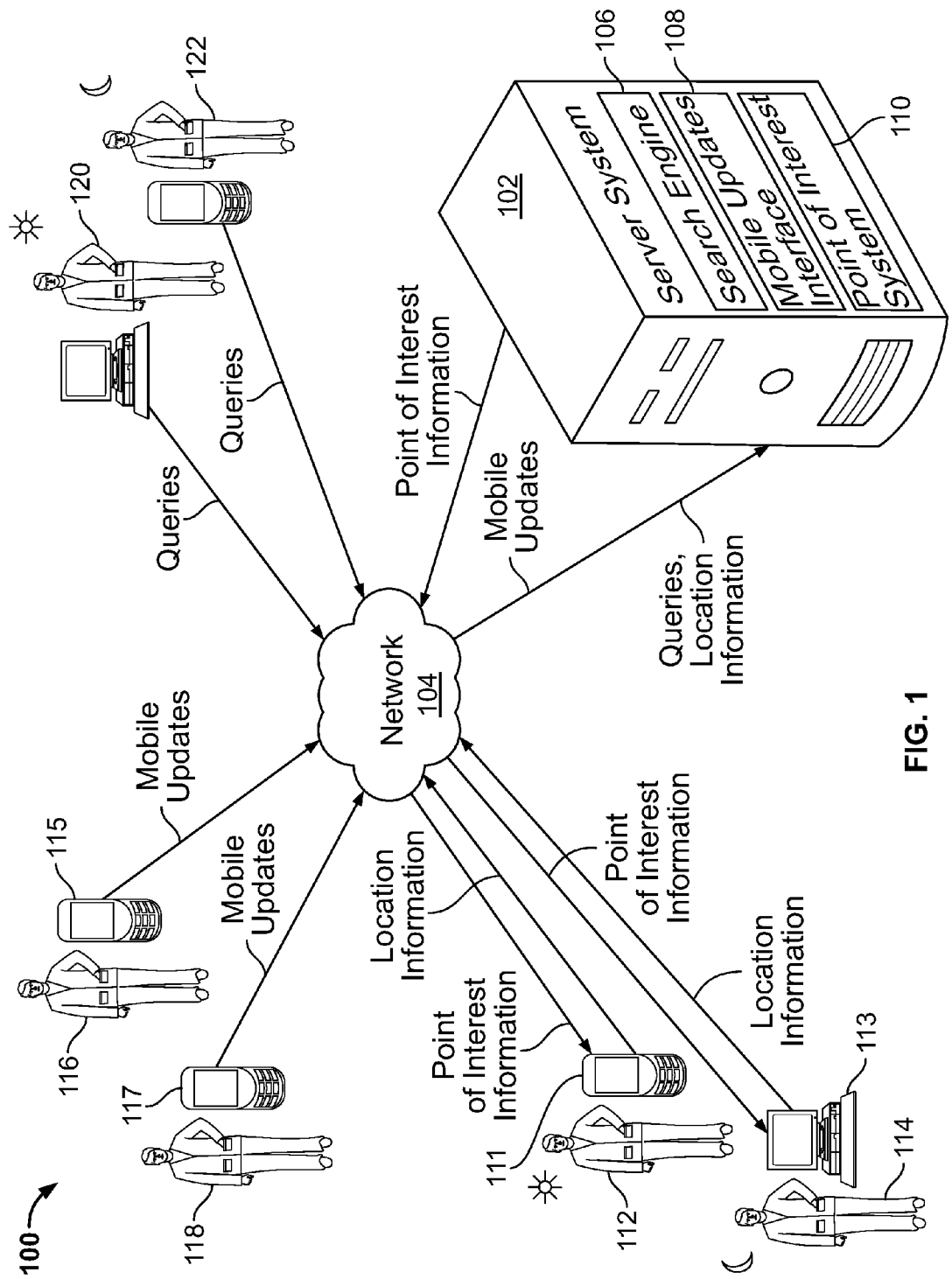
FIG. 1 is a schematic representation of an example system of a network including a system for determining point of interest information to provide to a user of an electronic device.

FIG. 1 is a schematic representation of an example system 100 that can provide point of interest information to a user of an electronic device that is relevant to the user's current location. A point of interest can be a business (e.g., a restaurant or theatre), a landmark (e.g., Mount Rushmore), a building (e.g., Empire State Building), a geographical feature (e.g., Hudson River) or other type of feature that may be of interest to a person in the vicinity of the physical location of the feature. The system 100 includes a server system 102, which for simplicity is shown as a single data processing apparatus, but can be implemented across multiple data processing apparatuses located in one or more physical locations. The server system 102 communicates with multiple users over a network 104. The network 104 can include one or more local area networks (LANs), a wide area network (WAN), such as the Internet, a wireless network, such as a cellular telephone network, or a combination of all of the above.

The point of interest information can be provided to a user of a mobile electronic device, for example user 112 of device 111, or to a user of a non-mobile device, such as a home computer, for example, user 114 of computer 113. The point of interest information can be provided as one or more suggested queries that the user can select to submit the query to a search engine 106. In response, the search engine 106 can search one or more bodies of information and provide results to the user's electronic device. In another example, the point of interest information can be provided as one or more graphical elements displayed on a map that shows the user's current location, where each graphical element represents a point of interest. In another example, the point of interest information can be presented to the user along with metadata such as a telephone number the user can select to initiate a telephone call to the point of interest (e.g., to call a restaurant for a reservation), a link to a website for the point of interest or links to website with other information, e.g., reviews, about the point of interest. The point of interest information can be presented to the user in other formats, and the above are but a few examples.

The server system 102 includes a point of interest system 110 that is configured to determine one or more points of interest to present to the user's electronic device that are relevant to the user's current location. The user's current location may be within a relatively close proximity to many points of interest and presenting all of them to the user may be overwhelming and simply not helpful. Techniques and systems are described here to filter the points of interest in close proximity to the user, so that a subset of the total number of points of interest can be selected to present to the user based on indicia that the selected points of interest would be interesting to a user at that current location and, in some instances, at the particular current time.

The server system 102 can also receive mobile updates provided by network users 116, 118. A mobile update is data, which can be about a point of interest, that a user inputs into an online social network. By way of illustrative example, Google Buzz for mobile allows a user to post updates and tag locations on-the-go and to read buzz updates authored by other people. A mobile update can be "snapped to" a location by the author, particularly if the subject matter of the update relates to the location. A location can be a point of interest, for example, a restaurant. An author may snap an update to the restaurant providing his or her comments about the restaurant, or to let other users of the social network know that he or she is at the restaurant or headed there. A mobile updates interface 108 can be included in the server system 102 to receive updates posted by users.

Figure 2:
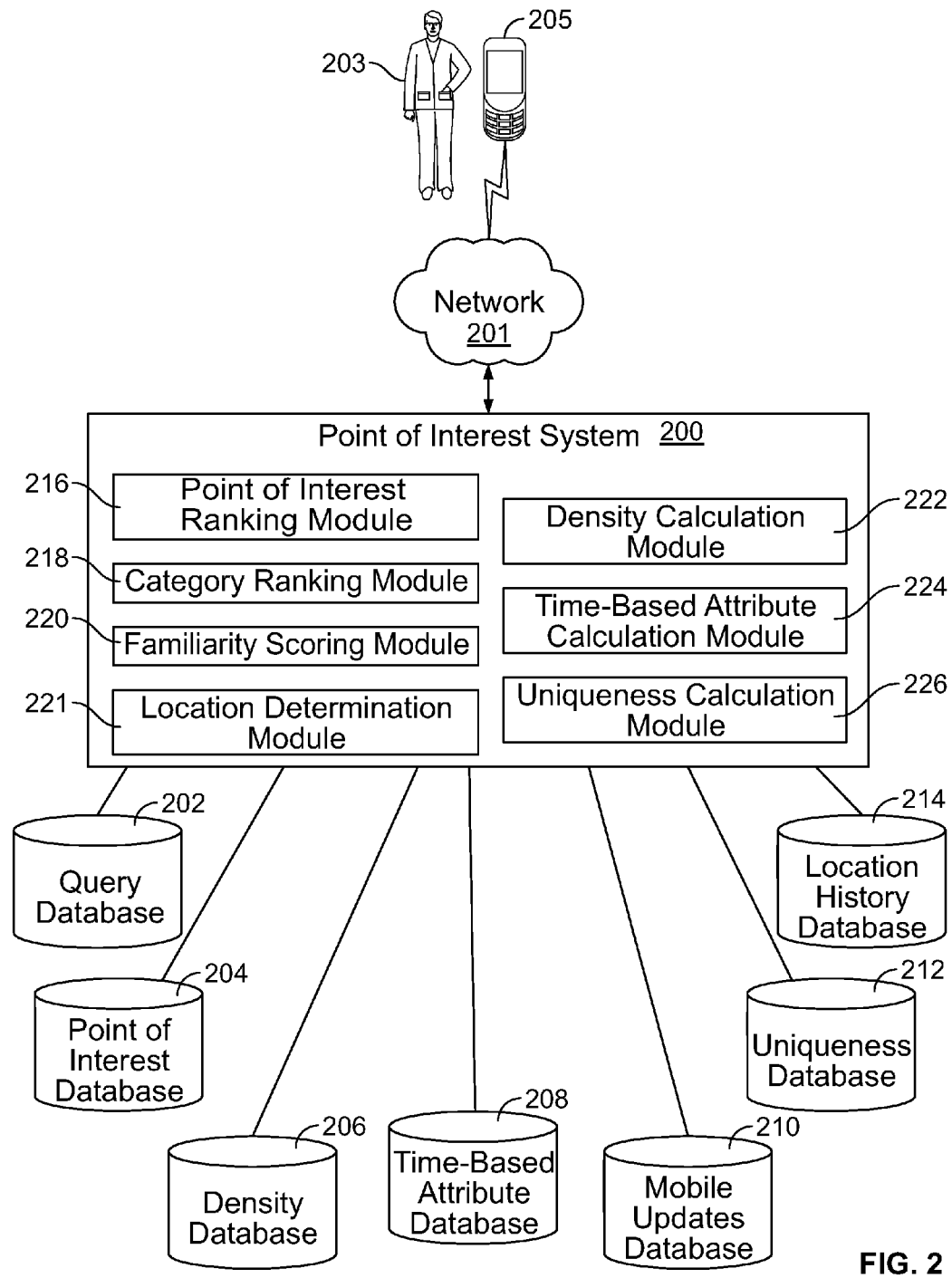
FIG. 2 is a schematic representation of an example a system for determining point of interest information to provide to a user of an electronic device.

FIG. 2 shows an example point of interest system 200 that can communicate with a user's electronic device 205 over a network 201. The point of interest system 200 can be the point of interest system 110 included in the server system 102 of FIG. 1. The point of interest system 200 for simplicity is shown as a single data processing apparatus, but can be implemented across multiple computers located in one or more physical locations. The network 201 can include one or more local area networks (LANs), a wide area network (WAN), such as the Internet, a wireless network, such as a cellular network, or a combination of all of the above. The electronic device 205 can be a mobile electronic device, e.g., a personal digital assistant, cellular telephone, smartphone, laptop, notebook, or other similar computing device, or can be a computing device that is typically not mobile, e.g., a digital computer, such as a desktop computer or workstation. The various components included in the point of interest system 200 will be described below in reference to various implementations of selecting a subset of points of interest to provide to a user's electronic device.

Figure 3:
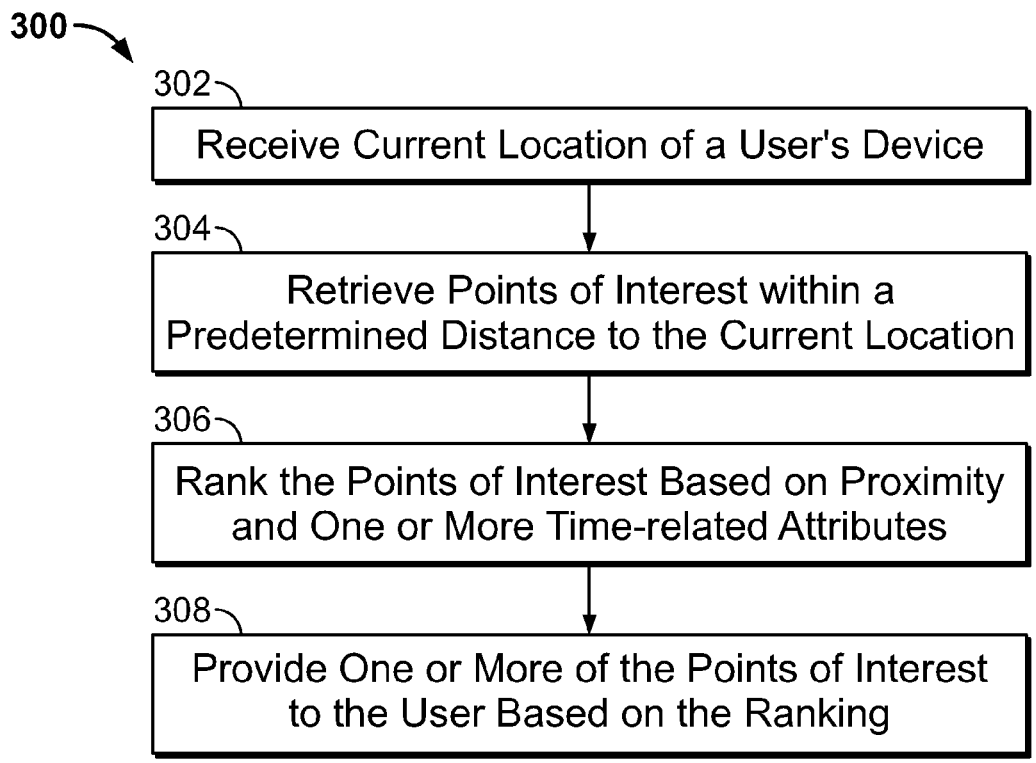
FIG. 3 is a flowchart showing an example process for ranking points of interest based on proximity and time-related attributes.

FIG. 3 is a flowchart showing an example process 300 for determining a subset of points of interest to provide to a user's electronic device. For illustrative purposes, the process 300 will be described in reference to the systems 100 and 200 shown in FIGS. 1 and 2, although it should be understood that differently configured systems can be used to implement the process 300. A current location of the user's electronic device is received (Step 302). The current location can be received from a location determination module 221, which in some implementations, is included as part of the point of interest system 200, although the module can be separate. If the user is using a mobile electronic device, then the geographical location of the mobile electronic device can be determined using various techniques, some of which include using a global positioning system (GPS) information from the mobile device, cellular telephone cell tower triangulation techniques, sending a request for the location to a location service (e.g., Skyhook Wireless of Boston, Mass.), retrieving the information from the mobile electronic device's network, or receiving a manual input from the user. As another example, if the user is using a WiFi-enabled device, the location of the device may be determined using known WiFi access points and their known geographic locations. If the user is using a computer, the user's geographical location can be determined using information from the user's network provider, for example, using the user's IP address (e.g., using a service provided by IP2Location.com of Penang, Malaysia).

Multiple points of interest within a predetermined distance to the current location are retrieved (Step 304). In some implementations, the predetermined distance is a fixed distance, for example, a one-kilometer radius around the current location. In other implementations, the value of the predetermined distance can vary based on the density of points of interest in proximity to the current location.

In one example, the value of the radius (R) can be calculated using the following formula: R=M/D. In this example, M is a constant that can be empirically determined, and in one particular example is 30,000. The variable D represents the density of points of interest in a region that includes the current location. The density D can be determined using various techniques. In some implementations, the surface of the Earth (or a portion thereof) is divided into square cells forming a grid. By reference to a database of points of interest indexed by location, the density of points of interest in each cell can be calculated.

The point of interest database 204 can include a listing of points of interest associated with locations, e.g., geographical coordinates. The point of interest database 204 can be used to calculate the density D of points of interest per cell, and the calculated densities can be stored in the density database 206. For a given current location, the density D of points of interest in the cell that includes the current location can be retrieved from the density database 206. The points of interest database 204 can be periodically updated to add or remove points of interest. The density database 206 can also be periodically updated, either at the same frequency or less often, to account for removals from and additions to the points of interest database 204.

In another example, the radius R can be calculated according to the following formula:

$$R = \sqrt{\frac{n \times 1000^2}{\pi \times D}}$$

In the above formula, n is an integer representing the number of points of interest that are desired to be found within the calculated radius (R). D is the density of points of interest per area, e.g., per square kilometer, in a cell that includes the current location.

The multiple points of interest retrieved from the points of interest database 204, using either a fixed distance from the current location, or a radius calculated based on the density of points of interest in proximity to the current location are ranked (Step 306). For each point of interest, the ranking is based (at least in part) on the proximity of the point of interest to the current location and on one or more time-related attributes. One or more of the points of interest are provided to the user's electronic device based on the ranking (Step 308).

With respect to ranking the points of interests based on proximity, the point of interest database 204 can include the points of interest mapped to corresponding geographic coordinates, e.g., GPS coordinates. The distance between two locations, i.e., the point of interest location and the current location, can then be computed by known methods. The closer in proximity the point of interest to the current location, the higher the ranking, generally.

With respect to ranking the points of interest based on one or more time-related attributes, a time-related attribute describes a characteristic of the point of interest that is dependent on time or time-sensitive. An example of a time-related attribute of a point of interest is whether or not the point of interest is open, i.e., the hours of operation of the point of interest. For example, if the point of interest has hours of operation (e.g., a restaurant, museum, gas station), and the hours of operation are known, then the current time (i.e., the time at which the current location was received) can be compared to the hours of operation to determine if the point of interest is currently open. If the point of interest is currently open, then the higher the ranking Metadata that includes the time-related attribute, i.e., the hours of operation, for a point of interest can be associated with the point of interest in the point of interest database 206 or stored in a separate database. The metadata can be obtained from various sources. For example, web pages relating to a point of interest can be crawled and the hours of operation extracted from information included in the web pages. In other examples, an operator of a point of interest or a third party aggregator of business listings data can provide the information.

In another example of a time-related attribute, relevancy can be determined as a function of time. For example, a "relevant time window" can be associated with a particular type or category of point of interest. For example, if the point of interest is a restaurant, then if the current time falls within blocks of time surrounding typical meal times, the ranking can be boosted. In another example, if the point of interest is a coffee shop, then if the current time falls within the early morning hours, the ranking can be boosted, since coffee shops are often most busy during this time of day. In another example, if the point of interest is a night club, then if the current time falls within the late evening hours, the ranking can be boosted, since that is when night clubs are typically most busy. In other implementations, the relevancy can vary throughout the time window and the ranking can be dynamically boosted depending on the actual time as compared to the relevancy of the category (or a particular business) at that time. These are a few examples of time-related business attributes, although different or additional ones can be used.

To implement the above, each point of interest can be associated with one or more categories. Categories can be differentiated by subject matter. For example, points of interest can be categorized into the following subject matter categories: restaurants, entertainment, museums, geographic features, etc. Differing granularity levels of categories can exist, for example, in addition to the broad restaurant category, there can also be sub-categories such as: Mexican restaurants, French restaurants, family restaurants, fast-food restaurants, etc. At least some of the categories can be associated with a time-related attribute, for example as described above. If the point of interest is associated with a category that is associated with a time-related attribute, then the ranking can be based (at least in part) on the time-related attribute.

The point of interest database 204 can include data linking the associated one or more categories with the points of interest. A time-related attribute database 208 can be provided that includes time-related attribute information organized by the point of interest categories. That is, include a selection of categories can be included in the time-related attribute database 208 and for each category, time-related attribute information can be provided. For example, the time-related attribute database 208 can include the category "restaurant" and include time-related attribute information being the times of day that can boost a ranking of a point of interest included in the restaurant category, e.g., 6:00-9:00 am, 11:30-1:30 pm and 5:00-8:00 pm. Therefore, when a point of interest is retrieved from the point of interest database 204 that is associated with the restaurant category, the time-related attribute database 208 can be checked to see if the restaurant category is associated with a time-related business attribute. When the restaurant category is found in the time-related attribute database 208, the times at which the time-related business attribute can boost the ranking of the point of interest can be compared to the current time (i.e., the time at which the current location was received) and if there is a match, the ranking can be boosted accordingly. In some implementations, the actual time can be compared to the relevancy at the particular time, which can vary through the relevant time window. That is, the boost can be different at 6:00 am as compared to 7:15 am as compared to 8:30 am, in one example.

Figure 4:
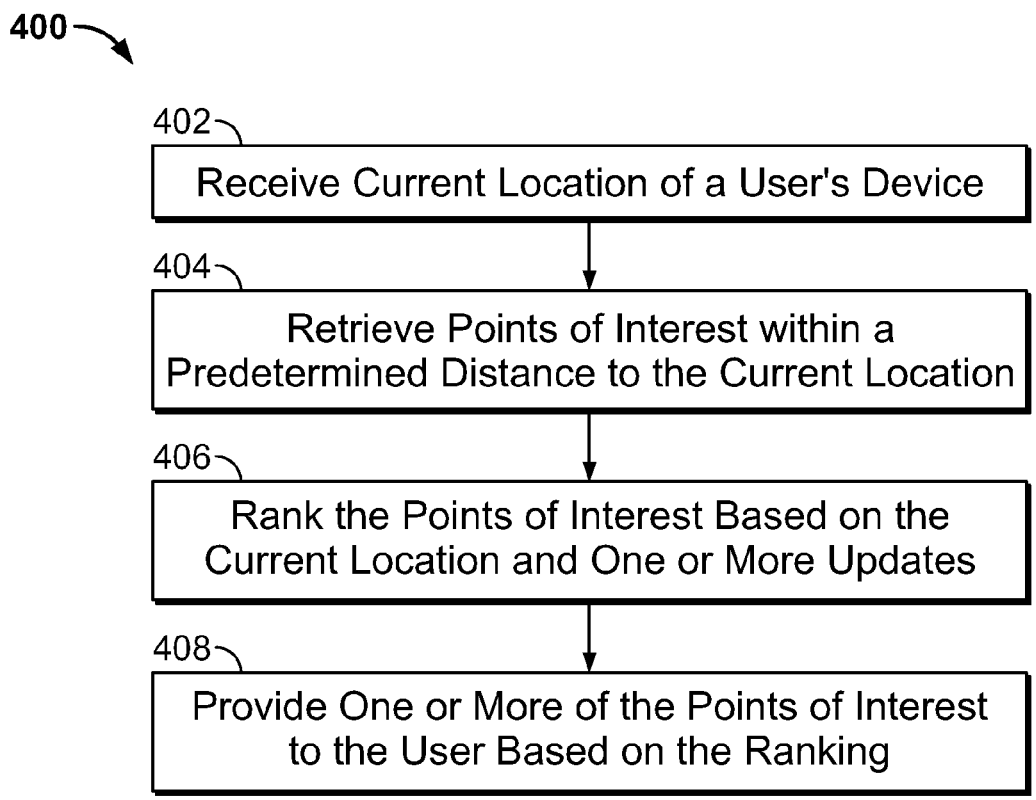
FIG. 4 is a flowchart showing an example process for ranking points of interest based on proximity and updates input by users in a social network.

FIG. 4 is a flowchart showing an example process 400 for determining a subset of points of interest to provide to a user's electronic device in a scenario in which at least some of the points of interest in the subset are associated with updates. For illustrative purposes, the process 400 will be described in reference to the systems 100 and 200 shown in FIGS. 1 and 2, although it should be understood that differently configured systems can be used to implement the process 400. A current location of the user's electronic device is received (Step 402). The current location can be received from the location determination module 221, and can be determined as described above.

Multiple points of interest within a predetermined distance to the current location are retrieved (Step 404). As described above, in some implementations, the predetermined distance is a fixed distance and in other implementations, the value of the predetermined distance can vary based on the density of points of interest in proximity to the current location. In some implementations, the distance is a straight line distance. In other implementations, the distance is a time-based distance. That is, the amount of time a user may travel from their current location and an estimated rate of travel is used to determine the distance. The rate of travel can be based on foot travel, car travel or otherwise. In other implementations, the distance is a route distance, as compared to a straight line distance. The points of interest can be retrieved from the point of interest database 204.

Each of the multiple points of interest is ranked based (at least in part) on the proximity of the point of interest to the current location. Additionally, the points of interest are ranked based on one or more "updates" associated with the points of interest (should the updates exist) (Step 406), as is described further below. As described above, an update is data about the point of interest input by an author other than the user into an online social network, which network preferably includes the user. One or more points of interest are provided to the user's electronic device based on the ranking (Step 408).

As discussed above, the points of interest can be provided to the user in a various formats, for example, as suggested search queries or as items displayed on a map that also includes the user's current location. If updates are associated with the points of interest, the updates can also be provided to the user. For example, the content of one or more of the updates can be displayed to the user, or an icon or other indicator can be displayed together with the point of interest to indicate that one or more updates exist relating to the point of interest. The user can select the icon or other indicator in order to view the content of the update, e.g., in a pop-up box.

Shown in FIG. 2, a mobile updates database 210 is a store of mobile updates associated with points of interest. FIG. 1 shows example authors of mobile updates 116 and 118. The authors 116 and 118 communicate their updates using their mobile electronic devices through the network 104 to the server system 102, for example, through the mobile updates interface 108. The updates can be accumulated and stored in the mobile updates database 210 and can be indexed by location. If a mobile update is snapped to a location that corresponds to the location of a point of interest, the mobile update can be associated with the point of interest in the mobile updates database 210.

Preferably, the authors of updates belong to an online social network accessible over the internet. For example, before being permitted to input an update, a user may be required to provide at least some personal information to register in a social network. Once registered, the user can then author updates and snap them to locations, including locations corresponding to points of interest. The user can also view the content of updates authored by other users. A user of the social network may be permitted to include privacy controls on who may view the content of updates he or she authors. For example, the user may be permitted to designate one or more "friends" in the social network that are permitted to view the user's updates, which can be kept private from anyone not designated as a friend. Alternatively, although a user may be permitted to designate one or more friends, he or she may choose to have his or her updates available to everyone on the social network, including those not identified as friends.

As noted above, the ranking of a point of interest can be based on updates associated with the point of interest (Step 406). In one example, the ranking of a point of interest that is associated with one or more updates is based on the proximity in the social network of the authors of the updates to the user. For example, if a designated friend of the user is the author of an update associated with a point of interest, the ranking of the point of interest can be boosted, as compared to if the author had no relation to the user in the social network. If the author is a designated friend of a designated friend of the user (i.e., a "friend-of-a-friend"), then the ranking of the point of interest can be boosted, although perhaps not as much as if the author is a designated friend of the user. In other examples, the ranking can be based on the freshness of the updates (i.e., the amount of time since they were created), the volume of updates associated with the point of interest, the identity of the author, or other attributes of the updates.

Figure 5:
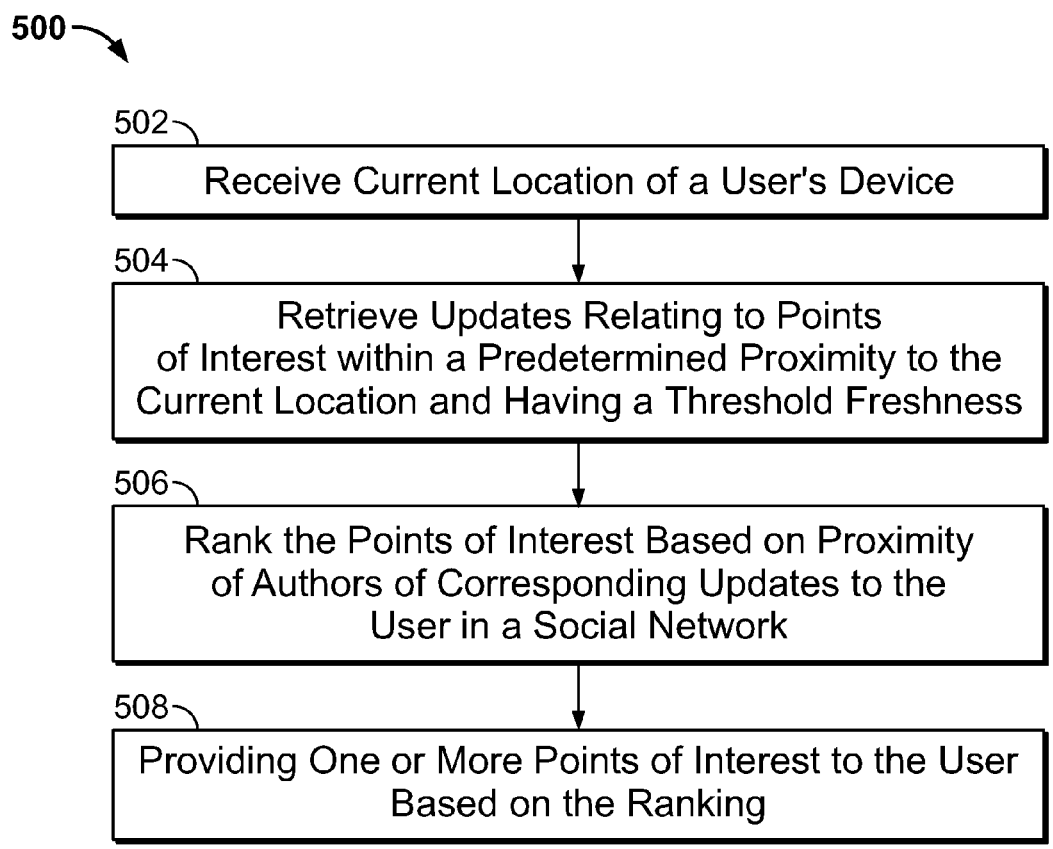
FIG. 5 is a flowchart showing an alternative example process for ranking points of interest based on proximity and updates input by users in a social network.

FIG. 5 is a flowchart showing an example process 500 for determining a subset of points of interest to provide to a user's electronic device. For illustrative purposes, the process 500 will be described in reference to the systems 100 and 200 shown in FIGS. 1 and 2, although it should be understood that differently configured systems can be used to implement the process 500. A current location of the user's electronic device at a current time is received (Step 502). The current location can be received from the location determination module 221, which in some implementations can be included as part of the point of interest system 200, and can be determined as described above.

Multiple updates associated with multiple points of interest are retrieved (Step 504). The updates are authored by users of a social network that includes the user of the electronic device and can be retrieved from the mobile updates database 210. The updates retrieved are associated with points of interest within a predetermined distance to the current location. The predetermined distance can be either a fixed distance from the current location, or a radius calculated based on the density of points of interest in proximity to the current location, as described above. Additionally, the updates can be retrieved based on their creation time. That is, preferably the updates retrieved have a certain level of "freshness" that can be determined by comparing their creation time to the current time. Filtering the retrieved updates by freshness can limit the number of updates retrieved and ensure a higher degree of relevance at the current time. The freshness window can be a few hours, a few days or otherwise. For example, if the frequency of updates being received with respect to a particular point of interest is high, then updates created within the past 24 hours may be retrieved, as compared to a point of interest that only occasionally is associated with updates, in which instance the freshness window may be a month or longer.

The points of interest associated with the retrieved updates are ranked based on the proximity of the authors of the points of interest to the user in the social network (Step 506). For example, as discussed above, if the author of an update is a "friend" of the user in the social network, then the associated point of interest can be boosted in the ranking.

One or more points of interest are provided to the user's electronic device based on the ranking (Step 508). The updates themselves can be presented to the user along with the points of interest, or optionally a link or other indicator can be provided that the user can select to view the content of the updates. In the process 500, the points of interest provided to the user are associated with at least one update meeting the freshness criteria.

Figure 6:
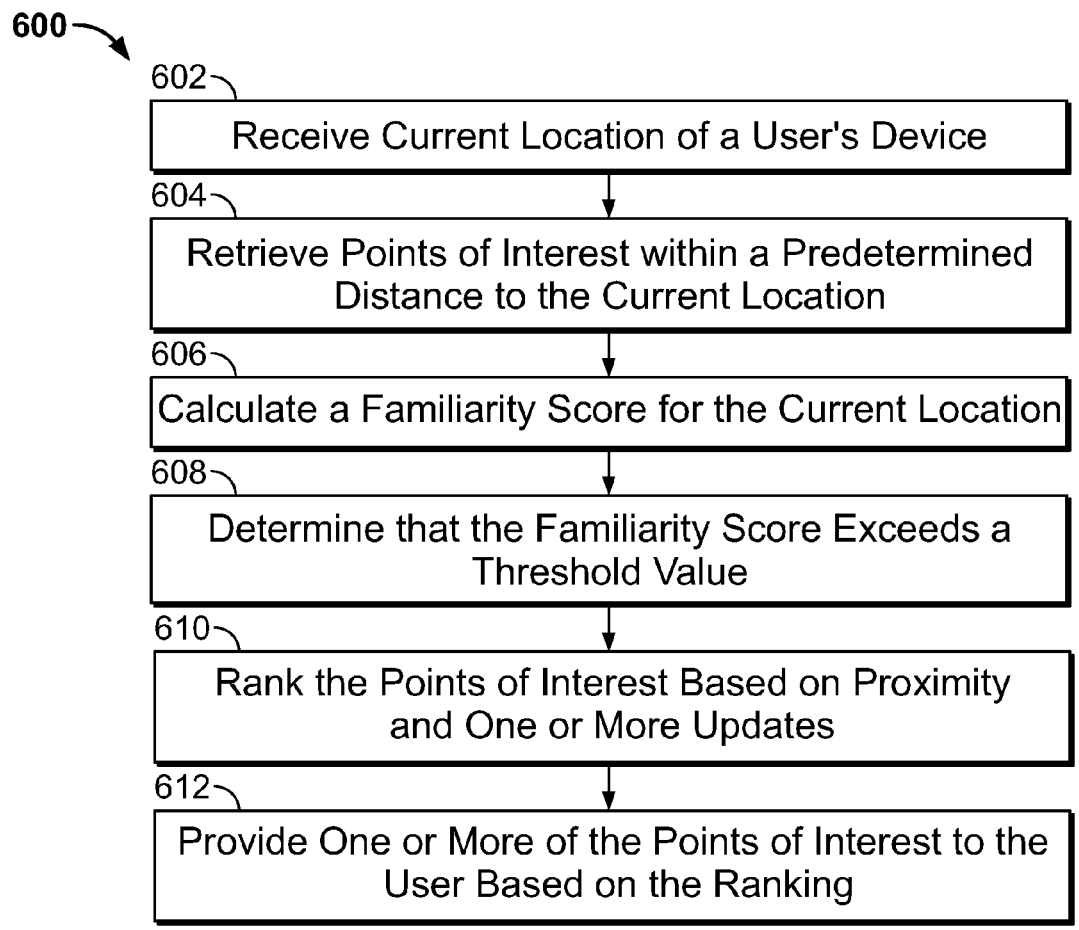
FIG. 6 is a flowchart showing an example process for ranking points of interest for a user familiar with their current location.

In some implementations, ranking points of interest based on updates can be selectively applied to users that are at a current location they frequent often. If the user is in an unfamiliar location, e.g., is a tourist, then applying different ranking criteria may yield more relevant results for that particular user. FIG. 6 is a flowchart showing an example process 600 that takes into account the user's familiarity with the current location when ranking points of interest. For illustrative purposes, the process 600 will be described in reference to the systems 100 and 200 shown in FIGS. 1 and 2, although it should be understood that differently configured systems can be used to implement the process 600.

A current location of the user's electronic device is received (Step 602). The current location can be received from the location determination module 221, and can be determined as described above. Multiple points of interest within a predetermined distance to the current location are retrieved (Step 604). As described above, in some implementations, the predetermined distance is a fixed distance and in other implementations, the value of the predetermined distance can vary based on the density of points of interest in proximity to the current location.

A "familiarity score" is calculated based on how often the user frequents the current location (Step 606). In some implementations, the familiarity score is calculated using the following formula:

Familiarity=Count(Locations within $X$ of Current Location)/Count(All locations)

In the above formula, the Count (Locations within X of Current Location) refers to the number of distinct current locations identified in a location history for the user that are within a predefined distance (i.e., X) to the user's current location. The Count (All locations) refers to the total number of current locations reported for the user in the location history, which can optionally be limited to a certain time period. For example, a historical set of reported current locations for the user can be stored (optionally with timestamps) in a store of location history indexed by user. The value for Count (All locations) can be obtained from the store of location history. In some implementations, the familiarity score can be calculated by a familiarity scoring module 220 (FIG. 2) included in the point of interest system 200. The users' location histories can be stored in, and retrieved from, a location history database 214.

Consider the following illustrative example: the user's current location is a coffee shop a block from his office and the predefined distance X is 1 kilometer. The Count (All locations) value for the user is 100 locations. The Count (Locations within 1 km of current location) is 55 locations. That is, in the last 100 reported current locations of this particular user, 55 times he was within 1 kilometer of his current location. His current location is a block (i.e., less than 1 kilometer) from his office, where he likely spends a lot of time, so in this instance, he is in a relatively familiar location. The familiarity score is therefore 55/100 or 0.55 out of a maximum score of 1.0 (i.e., if every location in the history store was within 1 km of his current location). Later, the user is 5 kilometers away from his office and the Count (Locations within 1 km of current location) is only 10 locations. The familiarity score is therefore 10/100 or 0.1, i.e., considerably lower. This formula can therefore be used to determine how often the user is in the vicinity of his current location, with the presumption being that the more often he is there, the more familiar he is with the current location. By contrast, a tourist is likely to have a very low familiarity score, since it may be the first time he or she has visited the current location.

A threshold value for the familiarity score can be determined, where a score above the threshold value is deemed to indicate that the user is familiar with the current location and a score below the threshold value is deemed to indicate that the user is somewhat unfamiliar with the current location. The threshold value can be selected as any value between 0 and 1.0. The value selected for the distance X also influences the familiarity score—since the smaller the value of X, the lower the number of locations within the user's location history that will be included in the Count numerator in the above formula. In one example, the threshold value is selected as 0.5 for a value of X being 1 kilometer. That is, if at least 50% of the reported locations for the user in the user's location history store are within 1 kilometer to the current location, the user is deemed to be familiar with the current location. Other values can be used, and these are just one illustrative example.

In response to determining that the familiarity score exceeds a threshold value (i.e., that the user is familiar with the current location), the points of interest are ranked based on their proximity to the current location and on one or more updates associated with the points of interest (Step 608). One or more of the points of interest are provided to the user based on the ranking (Step 610). The content of the updates or a mechanism for the user to select to view the updates can be provided along with the points of interest.

In some implementations, ranking a point of interest based on one or more associated updates includes determining how recent the update was input (i.e., determining the freshness) and boosting the ranking of recently input updates. In some implementations, ranking a point of interest includes, for each associated update, determining the proximity of the author of the update to the user in a social network. For example, as discussed above, if the author of an update is a "friend" of the user in the social network, then the associated point of interest can be boosted in the ranking.

If the familiarity score does not exceed the threshold value, i.e., if the user is deemed to be somewhat unfamiliar with the current location, then a different technique for ranking the retrieved points of interest can be applied. For example, the points of interest can be ranking based just on proximity of the corresponding locations to the current location. In other implementations, the points of interest can be ranked following the "place ranks" approach described in U.S. Patent Publication No. 2007/0143345 entitled "Entity Display Priority in a Distributed Geographic Information System", to Jones et al., filed on Oct. 11, 2006, and assigned to Google Inc., the entire contents of which are hereby incorporated herein by reference. That is, the points of interest can be ranked based on the weighted contributions of various non-cartographic meta attributes about a point of interest. Rather than directly measuring a characteristic of a physical place, such as its population, these attributes reflect traits of abstractions or representations associated with the point of interest. Examples of such attributes include: the description of the point of interest (e.g., if the point of interest is described in an online forum, the amount of detail in the description or the number of times a description has been viewed); an indicator of the popularity of the point of interest (e.g., the number of views or clicks on a placemark, e.g., in a map application, associated with the point of interest); and the relationship of a point of interest to its context, such as the category to which the point of interest belongs, all of which are described further in the above referenced patent publication.

In some implementations, the scoring function set out below can be used to assign a score to each retrieved point of interest. The assigned scores can be used as a basis for ranking the points of interest.

$$\text{Score} = A \times \text{sum}(f(\text{update}); \text{for each update}) + B \times \text{distance}(\text{current location, point of interest location}) + C \times (\text{distance-independent-score})$$

In the above function, A, B and C are multipliers whose value can be determined empirically and provide a weighted function, where different factors can be weighted differently. The multiplier A is multiplied by the sum of values assigned to each update based on the freshness of the update (i.e., how recently it was input) and/or based on the proximity of the author of the update to the user in the social network. The multiplier B is multiplied by the distance between the user's current location and the location of the point of interest. The multiplier C is multiplied by a score that can be assigned to the point of interest based on distance-independent criteria. For example, a score that could have been assigned to the point of interest using the place rank approach described above can be used in this scoring function, weighted by the value of C.

In some implementations, providing a user with a subset of categories of points of interest may be desirable. The user can then select one of the categories, and in response be provided with a subset of points of interest within the category. For example, a typical mobile electronic device (e.g., mobile telephone) has limited screen space. For such devices, the information selected to be provided to the user should be carefully selected, since only limited information can be displayed. In some implementations, rather than providing the user with a selection of points of interest (e.g., as a set of suggested search queries) or a display of a number of points of interest on a map, the user is provided with a set of categories from which the user can make a selection, e.g., restaurants, entertainment, shopping.

Determining which categories to provide to the user can be based on the current time. The current time can be a time of day, or a day of week or even a season. That is, some categories of points of interest may be more relevant to the user at one time than at a different time, which was discussed above. For example, a category for "coffee shops" may be more relevant in the morning than in the evening. The determination of which categories to select can be further determined by the current location. That is, a particular district in a city may be very popular for shopping during the day and then in the evening and night, very popular for entertainment, e.g., night clubs or lounges. If the current location of the user's electronic device is within the region during day, presenting the shopping category may be more useful, than if the current time was 10:00 pm, when all the shops are closed, and at which time it is more likely the user is in that location for entertainment purposes.

A set of categories can be stored in association with information that indicates, for each category, the probability that at a given time in a given location that category of points of interest will be relevant to a user. The set of categories and information can be stored in the time-related attribute database 208 (FIG. 2). The time-related attribute database 208 was discussed above, and can include categories associated with times at which the points of interest in the category are most relevant. The categories can be further mapped to locations. That is, given a particular location and time, one or more categories can be fetched from the time-related attribute database that are most likely to be relevant to the user.

In some implementations, an indicator of whether a user would find a point of interest in the category relevant is determined based on search activity. That is, the frequency that search queries are submitted to a search engine by users, where the search queries relate to the subject matter of the category at a given location, is used to estimate the categories' relevance to a user. In some implementations, click data can also be used as an indicator of whether a user would find a point of interest in a category relevant. Click data refers to data about the search results users clicked on when presented with responses to search queries. For example, if a particular query is found to relate to a "restaurant" category and in response to the search query the user clicked on two different results relating to two different restaurants, the results that were clicked are indicated by the click data as relating to the particular query.

Figure 7:
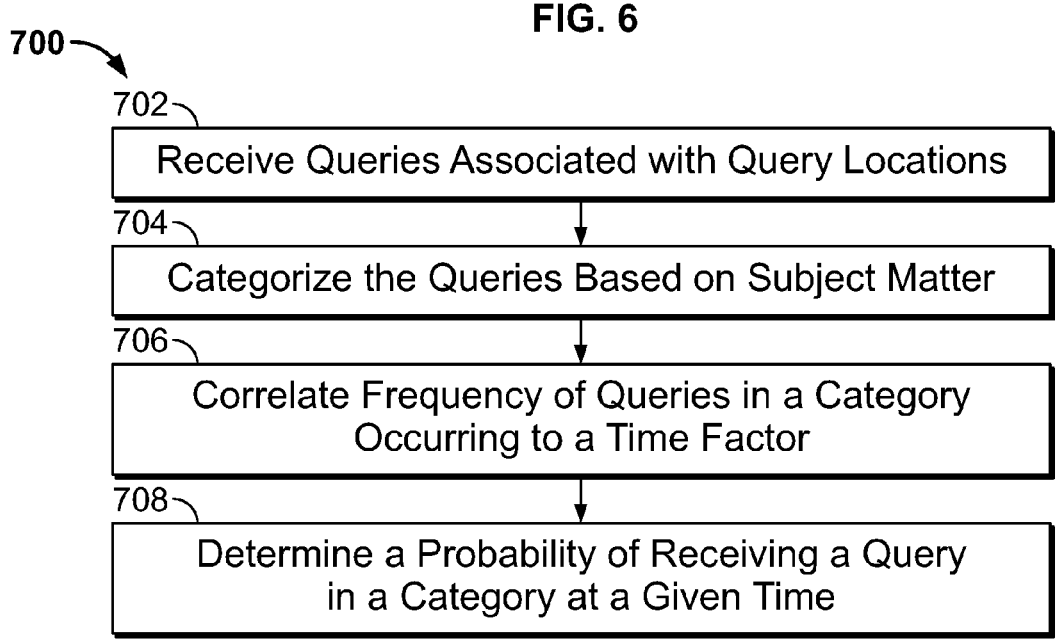
FIG. 7 is a flowchart showing an example process for determining the probability of a receiving a query in a category at a given time.

FIG. 7 is a flowchart showing an example process 700 for determining the probability of receiving a query relating to a category at multiple different times. Multiple queries are received that have been input by various users for submission to one or more search engines (Step 702). For example, users 120 and 122 (FIG. 1) submit search queries through the network 104 to the search engine 106 included in the server system 102. The search queries can be logged, for example, in a query database 202 (FIG. 2). Each search query can be associated with a query location. The query location is preferably a location that is related to the subject matter of the query.

For example, if the query is for EMPIRE STATE BUILDING, then the query location can be the location of the Empire State Building in New York City, e.g., expressed as the geographical coordinates of the building itself. Depending on the level of granularity desired for the query location, the location can be the city where the building is located, e.g., New York City. In some implementations, more than one query location relating to more than one level of granularity can be determined and associated with the query, e.g., a first query location can be the geographical coordinates of the building itself, while a second query location associated with this query can be the geographical coordinates for New York City (which can be the coordinates for the approximate center of the city, or can be the city boundaries).

Various techniques can be used for determining a query location that is related to the subject matter of the query. In some implementations, each term included in the query can be checked against a collection of terms predetermined to identify locations and if a match is found that term(s) can be identified as the query location. For example, the location of San Francisco can be extracted from a query for RESTAURANTS SAN FRANCISCO. In some implementations, the collection of terms is a database of location terms that can include administrative areas (e.g., streets, cities, districts, states, provinces, countries) and points of interest, e.g., geographical features (e.g., mountains, rivers, lakes), landmarks (e.g., important buildings, monuments) and venues (e.g., parks, stadiums, stores). Each location can have a corresponding latitude and longitude and may also include a shape or extent. Other techniques for determining a location that is related to the query can be used. For example, if the query is input into a search field in a map application, the user's interaction with a map displayed by the map application can be used to determine a location relating to the query. By way of illustration, if a map of the United Kingdom was displayed to the user, and the user zoomed in on the map to London and then input a search query COFFEE SHOPS, then the query location can be determined to be London, even though London was not a term in the query. In some implementations, for example, queries from which a location cannot be extracted or otherwise determined that is related to the subject matter of the query, the location of the user at the time he or she submitted the query can be used, as a default, if known.

As mentioned above, multiple queries are received from various users, that are associated with query locations and time stamped (Step 702). The queries are grouped into multiple categories based on the subject matter of the queries (Step 704). In some implementations, one query can be grouped into more than one category. Different categories can have differing levels of granularity or categories can be divided into sub-categories. For example, a query for TIM HORTONS may be grouped into a restaurant category, a coffee shop category and a fast-food category. Determining which category or categories into which to place a query can be accomplished in a variety of ways. In one example, the term or terms forming the query can be compared to a collection of terms that are associated with categories, and if a match is found then the query can be associated with the corresponding category or categories. For example, if the query includes the term CAFE and the collection of terms includes the term cafe associated with a restaurant category, then the query is grouped into the restaurant category. In another example, if the query includes the term CINEPLEX and the collection of terms includes the term cineplex associated with a movie theatre category and an entertainment category, then the query can be grouped into the movie theatre and entertainment categories.

With the queries grouped into categories, the frequency of queries being received into those categories can be correlated to different times. For example, queries may be received with a relatively high degree of frequency into the restaurant category in the late afternoon, as people are preparing to head to dinner. Queries may be received in the entertainment category in the evening and night with a high frequency as compared to in the morning. The queries are associated with query locations, and can therefore be further correlated by location. For each of multiple locations, a probability can be determined of receiving a query in each category at multiple different times (Step 706). That is, a statistical analysis of the correlated query data can be used as a basis for determining a probability of receiving a query in a particular category at a particular time. The probability can be used as an estimate of the probability that a point of interest within the category is interesting to a user at a given time in a given location. As mentioned above, in some implementations, click data can also be categorized and used to estimate the probability. In some implementations, where queries originating from mobile electronic devices can be distinguished from queries originating from non-mobile devices, the queries can be weighted differently when using them to estimate the probability. For example, queries originating from mobile electronic devices can be weighted more heavily than queries originating from non-mobile devices. In other implementations, only queries originating from mobile electronic devices are used as a basis for making the probability estimation.

The multiple locations can have a high or a low degree of granularity. For example, the probabilities can be determined on a country-by-country basis, that is, each of the multiple locations is a country. In another example, the probabilities can be determined on a city-by-city basis. In yet another example, the probabilities can be determined on a district-by-district basis, at least for large cities having multiple and potentially diverse districts. In yet another example, the probabilities can be determined for arbitrary divisions of the Earth's surface, for example, into cells of a given area. In one illustrative example, a collection of queries was analyzed on a country-by-country basis and peak times for receiving queries in different categories were identified. For example, in the "taxi" category, approximately 7:00 pm was the time associated with the highest frequency of taxi related queries. Approximately 5:00 pm was the time associated with the highest frequency of restaurant related queries in North American countries, but approximately 7:00 pm was the time in several European countries. That is, depending on the location, the peak time for receiving queries in the restaurant category varied.

In a system with a continuously growing query database 202, the analysis can be run periodically or continuously, to further refine the results. The time can be time of day, but can be further refined by time of day on a particular day, e.g., user search activity may be different on Friday as compared to Sunday. The time of year can also be factored in, since people tend to partake in more outdoor activities in the warmer seasons as compared to the colder seasons.

Figure 8:
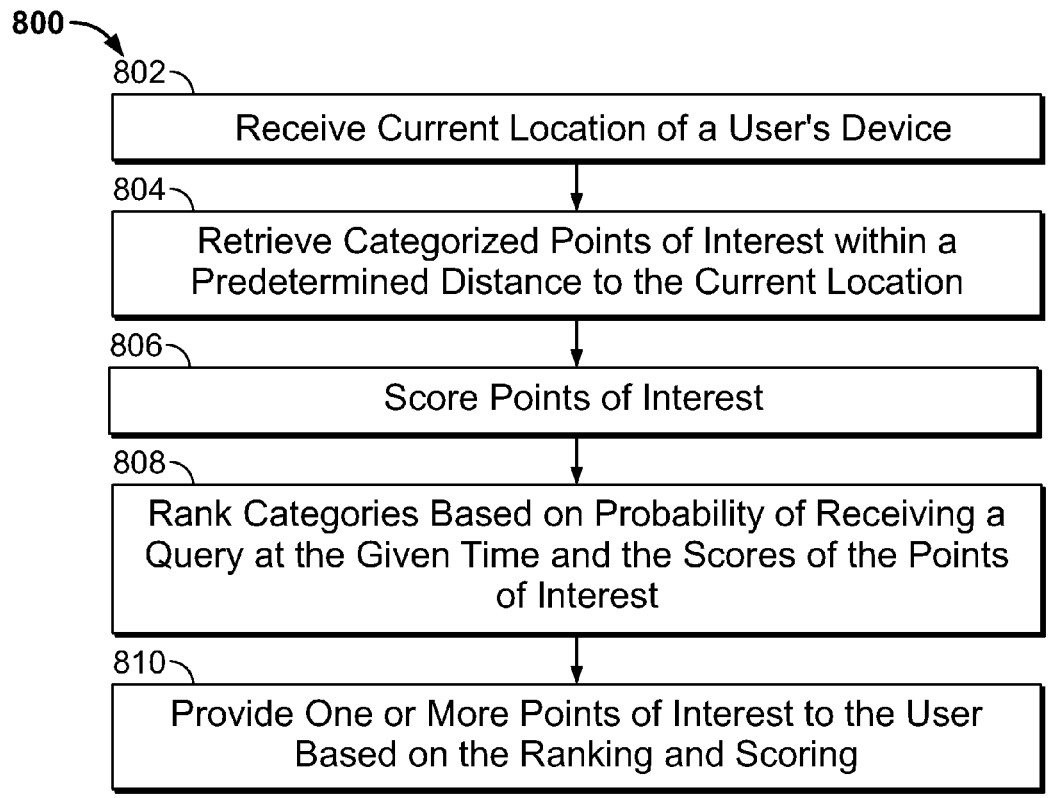
FIG. 8 is a flowchart showing an example process for ranking categorized points of interest.

FIG. 8 is a flowchart showing an example process 800 for determining a subset of points of interest to provide to a user's electronic device. For illustrative purposes, the process 800 will be described in reference to the systems 100 and 200 shown in FIGS. 1 and 2, although it should be understood that differently configured systems can be used to implement the process 800. A current location of the user's electronic device is received (Step 802). The current location can be received from the location determination module 221, and can be determined as described above.

Multiple categorized points of interest within a predetermined distance to the current location are retrieved (Step 804). As described above, in some implementations, the predetermined distance is a fixed distance and in other implementations, the value of the predetermined distance can vary based on the density of points of interest in proximity to the current location. For use in this process, the point of interest database 206 can associate one or more categories with each point of interest included in the database.

A score for each of the points of interest retrieved is determined. The score is based (at least in part) on the proximity of the point of interest to the current location (Step 806). That is, a distance between a geographical location of the point of interest and the current location is calculated, and the closer the point of interest to the current location, the higher the score. The point of interest ranking module 216 (FIG. 2) can be used to determine the score for each point of interest that is retrieved from the point of interest database 204.

The categories associated with the retrieved and scored points of interest are ranked. The ranking for a category is based on the scores of the points of interest included in the category and based on the probability of receiving a query from a user relating to the subject matter of the category at the current time in the current location (Step 808). That is, a category that includes points of interest that have scored highly (i.e., are close in proximity to the current location) is boosted in the ranking. Additionally, a category that is probably relevant to a user at the particular current time and location is also boosted in the ranking. The probability of receiving a query relating to the category at the particular current time and location is used as an indicator of the how relevant the category probably is to a user.

The category ranking module 218 (FIG. 2) can be used to rank the categories associated with the retrieved points of interest. The category ranking module 218 can retrieve the probability information from the time-related attribute database 210 for the categories.

In some implementations, the score for a point of interest can be further based on the "uniqueness" of the type of point of interest to the current location. That is, if in a close proximity to the current location there are two museums and 20 restaurants, then a point of interest that falls within the museum category is more unique (i.e., more exceptional) to that particular current location than a point of interest that is a restaurant. The uniqueness of the museum point of interest to that current location can boost the score of the point of interest.

In some implementations, the uniqueness of a type of point of interest can be estimated as follows. Determining a density of points of interest within a particular area was described above, and in the example system in FIG. 2, the density information is stored in the density database 206. The density of points of interest can be determined on a category-by-category basis. That is, for a given area, e.g., a square kilometer, the total number of restaurants within the area can be divided by the area to give the density of restaurants per square kilometer. The geographical areas can be divided into a grid of cells and the density of points of interest on a category-by-category basis can be determined for the cells. Depending on the subject matter of the category, it may be desirable to only calculate the category-densities for certain categories for certain cells. That is, the category-density for every category for every cell does not necessarily have to be determined. Similarly, the category-density may be determined for only high-level categories. For example, the restaurant category can be a parent category to various children categories, e.g., the Italian restaurant category, Mexican restaurant category, Chinese restaurant category, family restaurant category, and so on. The category-densities can be stored in the uniqueness database 212 (FIG. 2).

Figure 9:
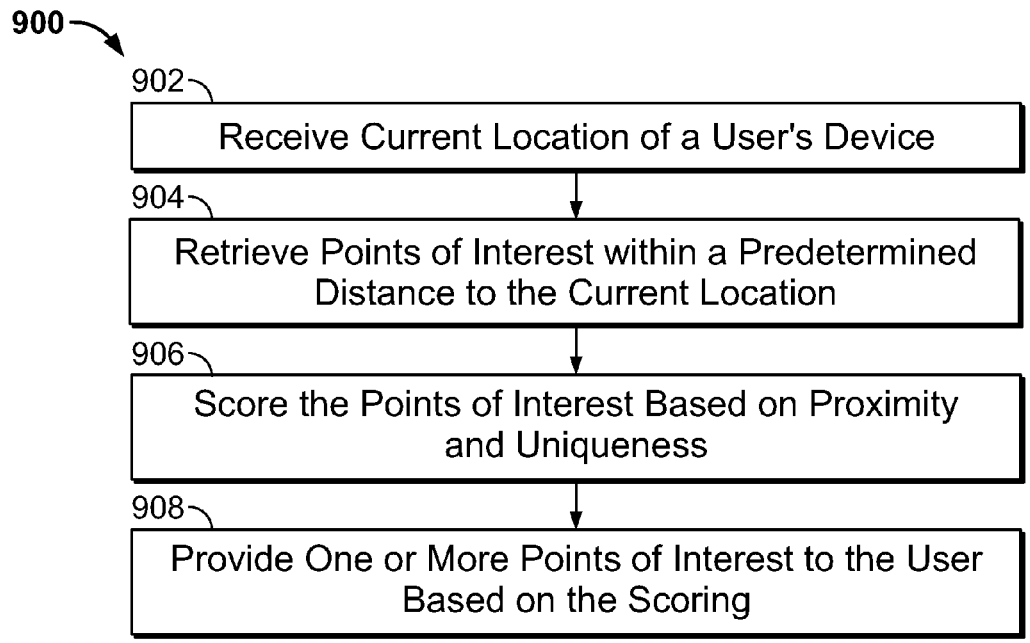
FIG. 9 is a flowchart showing an example process for ranking points of interest based on their uniqueness to their location.

FIG. 9 is a flowchart showing an example process 900 for determining a subset of points of interest to provide to a user's electronic device. For illustrative purposes, the process 900 will be described in reference to the systems 100 and 200 shown in FIGS. 1 and 2, although it should be understood that differently configured systems can be used to implement the process 900. A current location of the user's electronic device is received (Step 902). The current location can be received from the location determination module 221, and can be determined as described above.

Multiple categorized points of interest within a predetermined distance to the current location are retrieved (Step 904). As described above, in some implementations, the predetermined distance is a fixed distance and in other implementations, the value of the predetermined distance can vary based on the density of points of interest in proximity to the current location. Each point of interest is associated with one or more categories, which are differentiated from each other by subject matter. The points of interest are scored based on (at least in part) on their proximity to the current location and on their uniqueness to the current location (Step 906). As described above, their uniqueness to the current location can be estimated based on the category-density for the category corresponding to the point of interest. If the point of interest is included in more than one category and more than one category-density is available, the category-density values can be averaged, the medium value can be selected, either the highest or lowest value can be selected, or some other function of the values can be used. One or more points of interest are provided to the user's electronic device based on the scoring (Step 908).

By way of summary, the server system 102 (FIG. 1) can receive mobile updates from various users 116, 118. The server system 102 can also receive search queries from various users 120, 122. The search queries can be time stamped, so that the time of day during which particular search queries are received can be determined. For example, some queries are received during the day from a desktop computer, which queries might be quite different in subject matter than queries received in the evening from a mobile telephone. Information about the location (or from which a location can be determined) of an electronic device can be received from electronic devices. Based on the locations and potentially one or more other factors, as discussed above, data identifying one or more points of interest can be provided to the electronic devices from the server system 102. A point of interest system 110 can determine which one or more points of interest to provide to an electronic device, as was described above in reference to FIGS. 3-5, 8 and 9. In some implementations, one or more categories are provided to the electronic device, and a user of the electronic device can select a category, in response to which one or more points of interest relating to the category can be provided to the user. Category selection and point of interest selection can be depend on the time the information is requested or provided. For example, even if at the same location, a user who is at the location during the day may receive different point of interest information from the server system 102 than a user who is at the location during the evening.

FIGS. 3-6, 8 and 9 describe processes for providing one or more points of interest to a user based on a ranking or scoring. It should be understood that the various processes can be combined into one or more different combinations that can be used to provide the one or more points of interest to the user. For example, the process 300 describes ranking the points of interest based on proximity and one or more time-related attributes. The process 400 describes ranking the points of interest based on proximity and one or more updates. In some implementations, these processes can be combined and the ranking can be based on proximity, time-related attributes and updates. Process 500 shown in FIG. 5 describes retrieve updates having a threshold freshness and ranking points of interest based on the proximity of authors of the updates to the user in a social network. In some implementations, the process 500 can be combined with either or both of the processes 300 or 400. That is, the ranking can be based on proximity, time-related attributes and updates, including the freshness of updates and the authors of updates.

Process 600 shown in FIG. 6 describes calculating a familiarity score, and when the familiarity score exceeds a threshold value, the points of interest are ranked based on proximity and updates. In some implementations, process 600 can be combined with other processes described herein. For example, the familiarity score can be calculated and when the familiarity score exceeds a threshold value, then each point of interest can be ranked based on proximity, time-related attributes, updates, uniqueness (e.g., see process 900) and/or the ranking of a category that includes the point of interest (e.g., see process 800). Process 800 shown in FIG. 8 describes scoring categorized points of interest and ranking the categories. One or more points of interest are provided to the user based on the scoring of the points of interest and the ranking of the categories. The process 800 can be combined with other processes described herein. For example, scoring the points of interest can be based on proximity, time-related attributes, updates and/or uniqueness. Process 900 shown in FIG. 9 describes scoring points of interest based on proximity and uniqueness. Similarly, process 900 can be combined with other processes described herein. For example, scoring the points of interest can be further based on time-related attributes and/or updates. Other combinations and subcombinations are possible and contemplated by this description.

Figure 10:
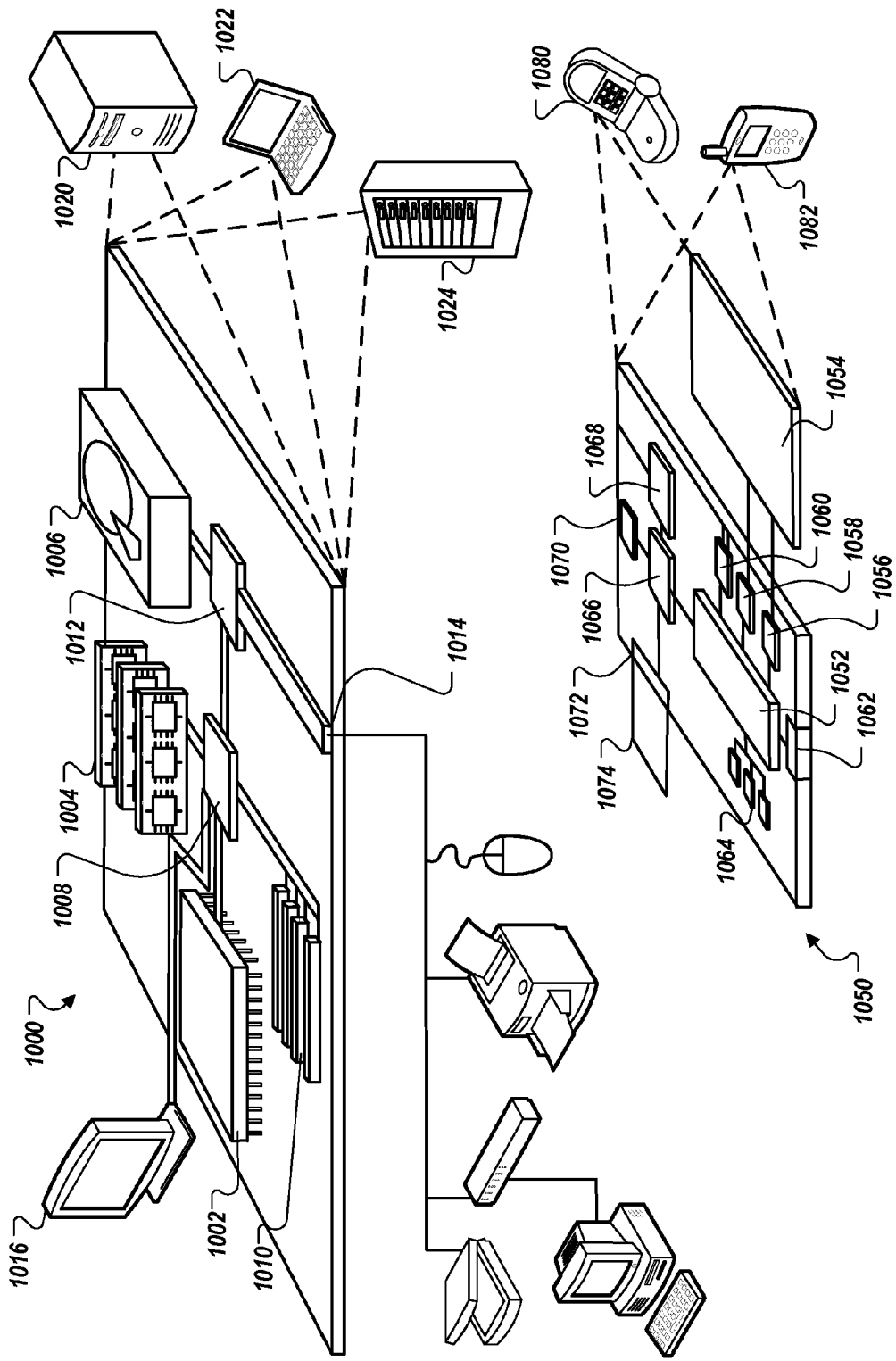
FIG. 10 shows examples of computer devices that may be used to execute the actions discussed in this document.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various buses, and may be mounted on a common motherboard or in other manners as appropriate. The processor 1002 may process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 may execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 may be implemented as one or more of a computer-readable medium or media, a volatile memory unit or units, or a non-volatile memory unit or units. Expansion memory 1074 may also be provided and connected to device 1050 through expansion interface 1072, which may include, for instance, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Device 1050 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 1050 and used to update the display of the respective devices 1050 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving a current location of a user's electronic device;
   retrieving a plurality of points of interest within a predetermined distance to the current location;
   determining one or more time-related attributes associated with each point of interest from a category associated with each point of interest, wherein the one or more time-related attributes include an attribute that maps the category to the times in which the category is likely to be relevant, and wherein determining the one or more time-related attributes includes empirically determining the attribute that maps the category to the times in which the category is likely to be relevant by performing steps including
      identifying a group of queries relating to the category in a time-stamped query log,
      determining which times queries in the group are submitted at a relatively high frequency, and
      mapping the determined times to the category;
   ranking each point of interest based on the point of interest's proximity to the current location and the one or more time-related attributes associated with the point of interest; and
   providing data identifying one or more of the points of interest to the electronic device for presentation to the user on a display of the electronic device based on the ranking.

2. The method of claim 1, further comprising:
   determining the predetermined distance based on a density of points of interest in an area including the current location.

3. The method of claim 2, wherein the predetermined distance is a radial distance from the current location and is further based on a desired number of points of interest to be retrieved.

4. The method of claim 1, wherein the one or more time-related attributes includes an attribute that indicates whether the point of interest is open or closed for operation at a time at which the current location is received and wherein if the point of interest is open, the ranking for the point of interest is boosted.

5. The method of claim 1, wherein the attribute that maps the category to times in which the category is likely to be relevant is an attribute that indicates a probability that the category associated with the point of interest is relevant to the user at a time at which the current location is received.

6. The method of claim 1, wherein providing one or more of the points of interest to the electronic device for presentation to the user on a display of the electronic device comprises providing the one or more points of interest as suggested search queries.

7. The method of claim 1, wherein providing one or more of the points of interest to the electronic device for presentation to the user on a display of the electronic device comprises:
   retrieving a portion of a map that includes the current location and the one or more points of interest; and
   providing the portion of the map to the electronic device for presentation to a user on a display of the electronic device, the map overlaid with one or more graphical elements representing the one or more points of interest wherein the one or more graphical elements are overlaid on the map in proximity to locations corresponding to the points of interest represented by the graphical elements.

8. A computer-readable storage device having instructions encoded thereon, which, when executed by a processor, cause the processor to perform operations comprising:
   receiving a current location of a user's electronic device;
   retrieving a plurality of points of interest within a predetermined distance to the current location;
   determining one or more time-related attributes associated with each point of interest from a category associated with each point of interest, wherein the one or more time-related attributes include an attribute that maps the category to the times in which the category is likely to be relevant, and wherein determining the one or more time-related attributes includes empirically determining the attribute that maps the category to the times in which the category is likely to be relevant by performing steps including
      identifying a group of queries relating to the category in a time-stamped query log,
      determining which times queries in the group are submitted at a relatively high frequency, and
      mapping the determined times to the category;
   ranking each point of interest based on the point of interest's proximity to the current location and the one or more time-related attributes associated with the point of interest; and
   providing data identifying one or more of the points of interest to the electronic device for presentation to the user on a display of the electronic device based on the ranking.

9. The computer-readable storage device of claim 8, wherein the operations further comprise:

determining the predetermined distance based on a density of points of interest in an area including the current location.

10. The computer-readable storage device of claim 9, wherein the predetermined distance is a radial distance from the current location and is further based on a desired number of points of interest to be retrieved.

11. The computer-readable storage device of claim 8, wherein the one or more time-related attributes includes an attribute that indicates whether the point of interest is open or closed for operation at a time at which the current location is received and wherein if the point of interest is open, the ranking for the point of interest is boosted.

12. The computer-readable storage device of claim 8, wherein the attribute that maps the category to times in which the category is likely to be relevant is an attribute that indicates a probability that the category associated with the point of interest is relevant to the user at a time at which the current location is received.

13. The computer-readable storage device of claim 8, wherein providing one or more of the points of interest to the electronic device for presentation to the user on a display of the electronic device comprises providing the one or more points of interest as suggested search queries.

14. The computer-readable storage device of claim 8, wherein providing one or more of the points of interest to the electronic device for presentation to the user on a display of the electronic device comprises:
  retrieving a portion of a map that includes the current location and the one or more points of interest; and
  providing the portion of the map to the electronic device for presentation to a user on a display of the electronic device, the map overlaid with one or more graphical elements representing the one or more points of interest wherein the one or more graphical elements are overlaid on the map in proximity to locations corresponding to the points of interest represented by the graphical elements.

15. A system comprising:
  one or more computers;
  one or more data storage devices coupled to the one or more computers and storing instructions, which, when executed by the one or more computers, cause the one or more computers to perform operations comprising:
    receiving a current location of a user's electronic device;
    retrieving a plurality of points of interest within a predetermined distance to the current location;
    determining one or more time-related attributes associated with each point of interest from a category associated with each point of interest, wherein the one or more time-related attributes include an attribute that maps the category to the times in which the category is likely to be relevant, wherein determining the one or more time-related attributes includes empirically determining the attribute that maps the category to the times in which the category is likely to be relevant by performing steps including
      identifying a group of queries relating to the category in a time-stamped query log,
      determining which times queries in the group are submitted at a relatively high frequency, and
      mapping the determined times to the category;
    ranking each point of interest based on the point of interest's proximity to the current location and the one or more time-related attributes associated with the point of interest; and
    providing data identifying one or more of the points of interest to the electronic device for presentation to the user on a display of the electronic device based on the ranking.

16. The system of claim 15, wherein the operations further comprise:
  determining the predetermined distance based on a density of points of interest in an area including the current location.

17. The system of claim 16, wherein the predetermined distance is a radial distance from the current location and is further based on a desired number of points of interest to be retrieved.

18. The system of claim 15, wherein the one or more time-related attributes includes an attribute that indicates whether the point of interest is open or closed for operation at a time at which the current location is received and wherein if the point of interest is open, the ranking for the point of interest is boosted.

19. The system of claim 15, wherein the attribute that maps the category to times in which the category is likely to be relevant is an attribute that indicates a probability that the category associated with the point of interest is relevant to the user at a time at which the current location is received.

20. The system of claim 15, wherein providing one or more of the points of interest to the electronic device for presentation to the user on a display of the electronic device comprises providing the one or more points of interest as suggested search queries.

21. The system of claim 15, wherein providing one or more of the points of interest to the electronic device for presentation to the user on a display of the electronic device comprises:
  retrieving a portion of a map that includes the current location and the one or more points of interest; and
  providing the portion of the map to the electronic device for presentation to a user on a display of the electronic device, the map overlaid with one or more graphical elements representing the one or more points of interest wherein the one or more graphical elements are overlaid on the map in proximity to locations corresponding to the points of interest represented by the graphical elements.

* * * * *